United States Patent
Liu et al.

(10) Patent No.: US 8,668,894 B2
(45) Date of Patent: Mar. 11, 2014

(54) METHOD FOR PROCESSING A SULFUR-CONTAINING GAS AND A HYDROGENATION CATALYST USED THEREFOR

(75) Inventors: Aihua Liu, Zibo (CN); Yiling Zhang, Zibo (CN); Xingzhong Xu, Zibo (CN); Jianli Liu, Zibo (CN); Weidong Tao, Zibo (CN); Jinshan Xu, Zibo (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 0 days.

(21) Appl. No.: 13/820,488

(22) PCT Filed: Aug. 4, 2011

(86) PCT No.: PCT/CN2011/001283
§ 371 (c)(1),
(2), (4) Date: Apr. 28, 2013

(87) PCT Pub. No.: WO2012/027948
PCT Pub. Date: Mar. 8, 2012

(65) Prior Publication Data
US 2013/0216462 A1     Aug. 22, 2013

(30) Foreign Application Priority Data
Sep. 1, 2010 (CN) .......................... 2010 1 0269123

(51) Int. Cl.

| | | |
|---|---|---|
| *B01D 53/50* | (2006.01) | |
| *B01D 53/48* | (2006.01) | |
| *B01J 27/053* | (2006.01) | |
| *B01J 23/75* | (2006.01) | |
| *B01J 23/755* | (2006.01) | |
| *B01J 23/85* | (2006.01) | |
| *B01J 23/745* | (2006.01) | |
| *B01J 21/06* | (2006.01) | |
| *C01B 17/04* | (2006.01) | |
| *C01B 17/16* | (2006.01) | |
| *B01J 23/882* | (2006.01) | |
| *B01J 23/888* | (2006.01) | |
| *B01J 21/04* | (2006.01) | |

(52) U.S. Cl.
CPC .......... *C01B 17/0404* (2013.01); *C01B 17/0408* (2013.01); *C01B 17/0456* (2013.01); *C01B 17/16* (2013.01); *C01B 17/164* (2013.01); *B01J 23/75* (2013.01); *B01J 23/882* (2013.01); *B01J 23/888* (2013.01); *B01J 23/745* (2013.01); *B01J 21/04* (2013.01); *B01J 21/063* (2013.01)
USPC ............ 423/244.01; 423/244.02; 423/244.09; 423/244.1; 423/573.1; 502/305; 502/325; 502/350; 502/217

(58) Field of Classification Search
CPC ............ C01B 17/0404; C01B 17/0408; C01B 17/0456; C01B 17/16; C01B 17/164; B01J 23/75; B01J 23/882; B01J 23/888; B01J 23/745; B01J 21/04; B01J 21/063
USPC ............... 423/244.01, 244.02, 244.09, 244.1, 423/573.1; 502/305, 325, 350, 217
See application file for complete search history.

(56) References Cited

U.S. PATENT DOCUMENTS

| | | | | |
|---|---|---|---|---|
| 4,175,928 | A * | 11/1979 | Britton et al. | 48/197 R |
| 4,192,857 | A | 3/1980 | Tellier et al. | |
| 6,444,185 | B1 * | 9/2002 | Nougayrede et al. | 423/242.1 |
| 8,142,748 | B2 * | 3/2012 | Massie | 423/244.02 |
| 2008/0039658 | A1 * | 2/2008 | Amakawa et al. | 564/490 |
| 2010/0284879 | A1 * | 11/2010 | Nedez et al. | 423/244.02 |

FOREIGN PATENT DOCUMENTS

| | | |
|---|---|---|
| CN | 1040610 A | 3/1990 |
| CN | 1336252 A | 2/2002 |
| CN | 1511781 A | 7/2004 |
| JP | 52114580 A | 9/1977 |

* cited by examiner

Primary Examiner — Timothy Vanoy

(74) Attorney, Agent, or Firm — Novick, Kim & Lee, PLLC; Allen Xue

(57) ABSTRACT

The present invention relates to a method for processing a sulfur-containing gas and a hydrogenation catalyst used therefor. The method comprises introducing the sulfur-containing gas into the tail gas hydrogenation unit of a sulfur recovery device, processing it with the hydrogenation catalyst of the present invention, and absorbing the hydrogenated tail gas with a solvent. The hydrogenation catalyst comprises from 0.5 to 3 wt. % of an active component nickel oxide, from 1 to 4 wt. % of an active component cobalt oxide, from 8 to 20 wt. % of an active component molybdenum oxide or tungsten oxide, from 1 to 5 wt. % of a deoxidation auxiliary agent, from 10 to 40 wt. % of $TiO_2$, the balance being $\gamma$-$Al_2O_3$, based on the weight of the catalyst.

12 Claims, 2 Drawing Sheets

METHOD FOR PROCESSING A SULFUR-CONTAINING GAS AND A HYDROGENATION CATALYST USED THEREFOR

CROSS REFERENCES TO RELATED APPLICATIONS

This application is a national stage entry of International Application No.: PCT/CN2011/001283 filed Aug. 4, 2011, which in turn claims priority to China Patent Application No. 201010269123.7 filed Sep. 1, 2010; each of which is hereby incorporated by reference herein in its entirety.

TECHNICAL FIELD

The present invention relates to a method for processing a sulfur-containing gas, in particular a flue gas regenerated by absorptive desulfurization of gasoline, and a hydrogenation catalyst used therefor.

BACKGROUND

In order to increase the quality of automobile gasoline, SINOPEC makes secondary development on the patent technology of absorptive desulfurization of gasoline purchased from ConocoPhillips, to produce low-sulfur clean gasoline having a sulfur content of lower than 10 ppm. SINOPEC has established eight sets of the gasoline-absorptive desulfurization equipment in the first phase, and will build several sets of the equipments in the second phase. The processing of the regenerated flue gas has become an important part indispensable to the equipment construction.

The adsorbent for absorptive desulfurization of gasoline needs to be regenerated by calcining after saturated by absorption, and the regenerated flue gas contains sulfur dioxide in a higher content. In the original patent, sulfur dioxide is removed by absorption with an alkaline solution. However, the processing of waste alkaline solution will result in secondary pollution, and waste the sulfur resources at the same time.

At present, no patent of introducing the flue gas regenerated by absorptive desulfurization of gasoline into the Claus tail gas hydrogenation unit of a sulfur device has been reported yet. This is primarily because that the regenerated flue gas comprises $SO_2$ in a maximum volume content of 5.4% and $O_2$ in a maximum volume content of 3.0%, and has a temperature of only 160° C., while the Claus tail gas hydrogenation catalyst in the prior art requires the $SO_2$ volume content of less than 0.5%, the $O_2$ volume content of less than 0.05% and a temperature of more than 280° C. Thus the Claus tail gas hydrogenation catalyst in the prior art cannot satisfy the requirements on hydrogenation of the flue gas regenerated by absorptive desulfurization of gasoline.

SUMMARY OF THE INVENTION

The present invention solves the aforesaid technical problem by providing a hydrogenation and deoxidation catalyst special for the sulfur-containing gas, and a method for processing such sulfur-containing gas. The catalyst of the present application has a high hydrogenation activity for sulfur dioxide and a low working temperature. In addition, the method for processing the sulfur-containing gas of the present invention can not only recover the sulfur resources, but also avoid the environmental pollution.

In one embodiment, the hydrogenation catalyst for hydrogenation of the sulfur-containing gas of the present invention is characterized in comprising from 0.5 to 3 wt. % of an active component nickel oxide, from 1 to 4 wt. % of an active component cobalt oxide, from 8 to 20 wt. % of an active component molybdenum oxide or tungsten oxide, from 1 to 5 wt. % of a deoxidation auxiliary agent, from 10 to 40 wt. % of $TiO_2$, the balance being $\gamma$-$Al_2O_3$, based on the weight of the catalyst.

In another embodiment, the deoxidation auxiliary gent is one or more selected from the group consisting of ferrous sulfate, ferric nitrate, ferric sulfate, palladium chloride and platinum chloride, preferably ferrous sulfate.

In another embodiment, the catalyst comprises from 1.0 to 1.5 wt. % of an active component nickel oxide, from 2.0 to 3.0 wt. % of an active component cobalt oxide, from 12 to 15 wt. % of an active component molybdenum oxide or tungsten oxide, from 2 to 4 wt. % of a deoxidation auxiliary agent, from 20 to 30 wt. % of $TiO_2$, the balance being $\gamma$-$Al_2O_3$, based on the weight of the catalyst. In another embodiment, the sulfur-containing gas comprises from 0 to 6 vol. % of sulfur dioxide and from 0 to 3 vol. % of oxygen, and has a temperature of preferably from 100 to 200° C.

In another embodiment, the catalyst is produced by using titanium-aluminum compound dry colloid as the main raw material, bar-extruding, drying, calcining to prepare a support; said support being impregnated with a deoxidation auxiliary agent, dried, calcined to produce a semi-finished product; said semi-finished product being impregnated with an impregnation solution of the active component, further dried and calcined.

Said titanium-aluminum compound dry colloid is prepared by placing a sodium metalluminate solution being diluted to 5-60 g of $Al_2O_3$/L in a colloidization tank, controlling the colloid-forming temperature to be 0-30° C., feeding $CO_2$ having a volume concentration of 3-40% for neutralization, pulping metatitanic acid, slowly adding metatitanic acid slurry for a period of time which is controlled to be 10-20 min when $CO_2$ begins to be fed, so as to make the weight content of titania achieve 30-60% in the dry colloid, controlling the pH value of the glue solution to be 10-12, stopping the colloidization, filtering, washing, drying and pulverizing to 180 meshes, to produce a titanium-aluminum compound dry colloid.

The titanium-aluminum compound dry colloid has a pore volume of greater than 0.6 ml/g, a specific surface area of greater than 250 m$^2$/g, a sodium weight content of less than 0.1%, and a $SO_4^{2-}$ weight content of less than 0.2%. Preferably, the titanium-aluminum compound dry colloid has a pore volume of from 0.60 to 0.90 mL/g, a specific surface area of from 270 to 380 m$^2$/g, a sodium weight content of less than 0.1%, and a $SO_4^{2-}$ weight content of less than 0.2%.

The active component is a ternary component consisting of one selected from the Group VIB elements and two selected from the Group VIII metal elements.

The catalyst has the advantages of high COS and $CS_2$ hydrolysis activity and $SO_2$ hydrogenation activity at lower reaction temperature, removing oxygen from the sulfur-containing gas by adding a deoxidation auxiliary agent, using as the active component the ternary metal of Groups VIB and VIII so as to increase the $SO_2$ hydrogenation activity.

In another embodiment, the catalyst of the present invention is prepared by the following method:
  mixing and kneading a titanium-aluminum compound dry colloid having a pore volume of more than 0.6 mL/g, a specific surface area of greater than 250 m$^2$/g, a sodium content of less than 0.1% (m/m), and a $SO_4^{2-}$ content of less than 0.2% (m/m), a pore-expanding agent and a binder, bar-extruding, drying, calcining to produce a support;

The support is impregnated with the deoxidation auxiliary agent, dried, calcined to produce a semi-finished product;

The semi-finished product is impregnated with the active component impregnation solution, further dried, calcined to produce a low-temperature, oxytolerant hydrogenation catalyst having a high activity for the sulfur-containing gas.

The pore-expanding agent is selected from the group consisting of polyvinyl alcohol, polyacrylamides, sesbania powder, citric acid, starch and the like, preferably sesbania powder.

The binder is selected from the group consisting of water, acetic acid, citric acid, oxalic acid and nitric acid, preferably citric acid.

The support is calcined at a temperature of from 500 to 600° C., preferably 550° C.

The support has an appearance preferably clover-type or four-leaf clover-type.

The support has a pore volume of greater than 0.4 mL/g, preferably greater than 0.45 mL/g, and a specific surface area of more than 280 m$^2$/g, preferably more than 300 m$^2$/g.

The deoxidation auxiliary gent is one or more selected from the group consisting of ferrous sulfate, ferric nitrate, ferric sulfate, palladium chloride and platinum chloride, preferably ferrous sulfate.

The semi-finished product is calcined at a temperature of from 350 to 450° C., preferably 400° C.

The active component is a ternary component selected from Group VIB elements and/or Group VIII metal elements, and the amount of Group VIB metal oxides is from 8 to 20% (m/m), preferably from 12% to 15% (m/m), and the amount of Group VIII metal oxides is from 1.5 to 7% (m/m), preferably from 2.5% to 3.5% (m/m), based on the weight of the catalyst. The deoxidation auxiliary agent is in an amount of from 1 to 5%.

The Group VIB metal element is molybdenum or tungsten, preferably molybdenum, and the precursor is molybdenum oxide; the Group VIII metal element is cobalt and nickel, and the precursor is nickel carbonate and basic cobalt carbonate. Since no metal nitrate is used during the preparation, no NOx is produced during the calcining process, so that the preparation is clean and environment-friendly.

The catalyst is calcined at a temperature of from 200 to 500° C., preferably 400° C.

The preparation process of the present invention is more specifically stated as follows.

1. Preparation of the Support

A titanium-aluminum compound dry colloid having a pore volume of more than 0.6 mL/g, a specific surface area of greater than 250 m$^2$/g, a sodium content of less than 0.1%, and a $SO_4^{2-}$ content of less than 0.2%, a binder (e.g. water, nitric acid, acetic acid, oxalic acid and citric acid), a pore-expanding agent (e.g. polyvinyl alcohol, polyacrylamides, sesbania powder, citric acid, starch and the like) are added into a kneader. The mixture was kneaded, molded by extrusion with φ3 mm clover-type pore plate (or in other shapes), oven-dried at 110-150° C. for 2-4 h, calcined at 500-600° C. for 2-5 h to produce a support comprising from 10 to 40% (m/m), preferably from 20 to 30% (m/m) of $TiO_2$, and from 40 to 90% (m/m), preferably from 65 to 75% (m/m) of $Al_2O_3$.

$N_2$ absorption process is used to determine the specific surface area and pore volume of the prepared support.

2. Preparation of the Semi-Finished Product

A stabilizer (citric acid, acetic acid, hydrochloric acid or sulfurous acid) is added into deionized water, dissolved by stirring and mixing. A deoxidation auxiliary agent in a required amount is added to form a stable solution. The stabilizer is in an amount of from 1/10 to 1/5 of the total weight of the deoxidation auxiliary agent. Stirring is conducted until complete dissolution is achieved, to obtain a stable solution.

A support is impregnated by said stable solution for from 10 min to 2 h, preferably from 0.5 to 1 h, oven-dried at 110-150° C. for 2-6 h, calcined at 200-500° C. for 2-5 h to obtain the semi-finished catalyst of the present invention. The catalyst of the present invention comprises from 1 to 5 wt. %, preferably from 2 to 4 wt. % of $FeSO_4$.

3. Preparation of the Catalyst

The active component-complexing agent (citric acid or phosphoric acid) is added into deionized water and heated to more than 70° C. Cobalt salt, molybdenum salt and nickel salt in the required amounts are added while being continuously stirred, so as to form a stable solution. The complexing agent is in an amount of from 1/5 to 1/2, preferably 1/3 of the total weight of the active component metal salt. Stirring is conducted until complete dissolution is achieved, to obtain the active component co-impregnation solution.

A support is impregnated by said co-impregnation solution for from 10 min to 3 h, preferably from 0.5 to 1 h, oven-dried at 110-150° C. for 2-6 h, calcined at 200-500° C. for 2-5 h to obtain the catalyst of the present invention. The catalyst of the present invention comprises from 0.5 to 3 wt. %, preferably from 1.0 to 1.5 wt. % of nickel oxide, from 1 to 4 wt. %, preferably from 2.0 to 3.0 wt. % of cobalt oxide, from 8 to 20 wt. %, preferably from 12 to 15 wt. % of molybdenum oxide, from 1 to 5 wt. %, preferably from 2 to 4 wt. % of $FeSO_4$, from 10 to 40 wt. %, preferably from 20 to 30 wt. % of $TiO_2$, the balance being γ-$Al_2O_3$, based on the weight percent of the catalyst.

The method for processing the sulfur-containing gas using the hydrogenation catalyst prepared according to the present invention comprises introducing the sulfur-containing gas into the tail gas hydrogenation unit of the sulfur recovery device, processing with the hydrogenation catalyst of the present invention, absorbing the hydrogenated tail gas with a solvent and then regenerating (the same as the original process), the regenerated hydrogen sulfide being recycled to the Claus unit to recover sulfur, the clean tail gas being incinerated in an incinerator to reach the standards and discharged.

Wherein, (1) The hydrogenation catalyst of the present invention is precured with the conventional Claus tail gas under the conditions of a temperature of from 220 to 280° C., a volume space velocity of from 400 to 1,500 h$^{-1}$, from 3 to 8 vol. % of hydrogen in the feed gas; the curing is finished when the $H_2S$ content at the outlet of the reactor is greater than or equal to that at the inlet of the reactor; and (2) after curing, adjusting the inlet temperature of the hydrogenation reactor to be from 220 to 280° C., at which the sulfur-containing flue gas is introduced.

The sulfur-containing gas of the present invention is the gas produced during the petrochemical processing and chemical processing of coal and comprising one or more selected from sulfur dioxide, mercaptan, thioether, $CS_2$ and COS, including flue gas regenerated by absorptive desulfurization of gasoline, flue gas regenerated by desulfurization of liquefied gas, flue gas regenerated by catalytic cracking, Claus tail gas, boiler flue gas, preferably one or more selected from flue gas regenerated by absorptive desulfurization of gasoline, flue gas regenerated by desulfurization of liquefied gas and Claus tail gas.

Said sulfur-containing gas comprises from 0 to 6 vol. % of sulfur dioxide and 0 to 3 vol. % of oxygen and has a temperature of preferably from 100 to 200° C.

Advantages of the Present Invention

The method and the catalyst of the present invention can be used for hydrogenation of the sulfur-containing gas at an inlet temperature of 220-280° C., wherein said sulfur-containing gas can be processed by directly introducing into the tail gas processing unit of the sulfur device without the need of adding any other equipments. Up to now, it is the most desirable way for processing the sulfur-containing gas, and such a method not only recovers the sulfur resource, but also avoids the environmental pollution. The hydrogenation catalyst of the present invention has an activity which is 30% higher than that of the conventional Claus tail gas hydrogenation catalyst, a working temperature which is lower by more than 60° C., a notable energy-saving and consumption reduction effect, and better economic benefits and environmental protection benefits.

DESCRIPTION OF THE DRAWINGS

In FIG. 1, 1—the sulfur-containing gas; 2—the hydrogen-containing Claus tail gas; 3—the hydrogenation reactor; 4—the quench tower; 5—the absorption tower; 6—the regeneration tower; 7—hydrogen sulfide is recycled to the sulfur-producing unit; 8—the incinerator; 9—the tube for removal of fume in the clean tail gas.

In FIG. 2, BV1-BV22—the globe valves; 3BV1-3BV2—the three way globe valves; CV1-CV6—the one way valves; EPC—the electronic pressure controller; F1-F8—the filters; GC—the gas chromatograph; MFC1-MFC 6—the weight flow controller; NV1-NV8—the stop valves; P—the metering pump; PIB—the standard pressure gauge; PIO1-PIO13—the pressure gauge; PRV1-PRV6—the pressure relief valves; RHC—the low temperature bath; TIC01—the temperature control; TI01—the reaction temperature display; V1—the stock tank; V2—the bubbler; V3—the drain sump; V4—the caustic treater.

EMBODIMENTS

Example 1

Preparation of Titanium-Aluminum Compound Dry Colloid

Figure 1:
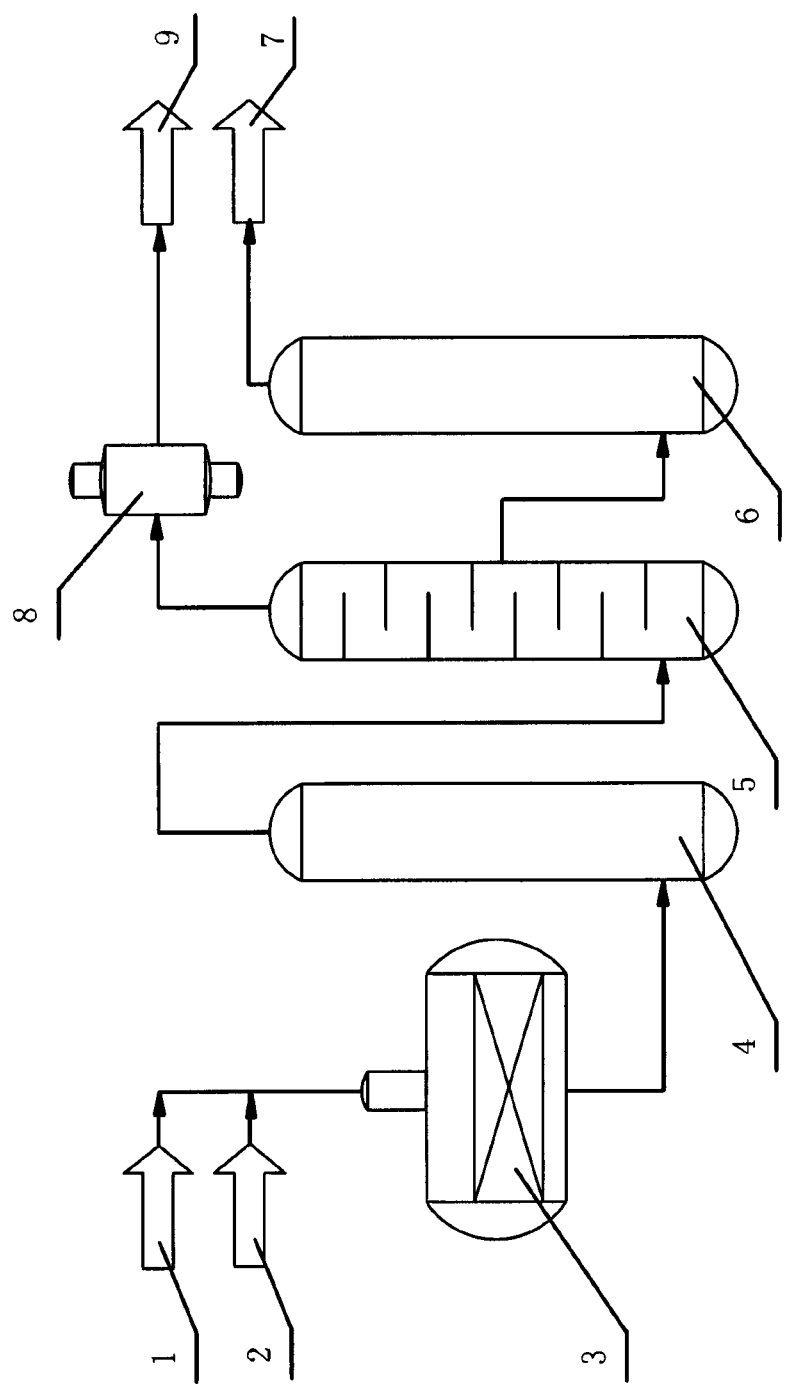
FIG. 1 is the flow process chart of the present invention.

A sodium metaluminate solution containing 40 g of $Al_2O_3$/L was placed in a colloid-forming tank, and the colloid-forming temperature was controlled to be 20° C. $CO_2$ having a volume concentration of 35% was fed for neutralization, and metatitanic acid was pulped. When $CO_2$ began to be fed, metatitanic acid slurry was slowly added for a period of time which was controlled to be 10-20 min, so as to make the weight content of titania achieve 50% in the dry colloid, and to control the pH value of the glue solution to be 10-12. After stopping the colloidization, a titanium-aluminum compound dry colloid 1 was prepared by filtering, washing, drying and pulverizing to 180 meshes. By the same method, a titanium-aluminum compound dry colloid 2 having a titania content of 40%, a titanium-aluminum compound dry colloid 3 having a titania content of 30%, a titanium-aluminum compound dry colloid 4 having a titania content of 20%, a titanium-aluminum compound dry colloid 5 having a titania content of 10%, and a titanium-aluminum compound dry colloid 6 having a titania content of 0% were also prepared.

The physicochemical properties of dry colloids having different titania contents are shown in Table 1.

TABLE 1

Physicochemical properties of dry colloids having different $TiO_2$ contents

| Dry colloid | $TiO_2$, % | Pore volume/ $ml \cdot g^{-1}$ | Specific surface area/$m^2 \cdot g^{-1}$ |
|---|---|---|---|
| 1 | 50 | 0.52 | 249 |
| 2 | 40 | 0.60 | 281 |
| 3 | 30 | 0.71 | 313 |
| 4 | 20 | 0.80 | 345 |
| 5 | 10 | 0.89 | 379 |
| 6 | 0 | 0.98 | 410 |

Example 2

Preparation of Titanium-Aluminum Compound Dry Colloid Support 100 g of titanium-aluminum compound dry colloids with different $TiO_2$ contents were respectively weighed and added into a kneader. 5 g of sesbania powder was also added and homogeneously stirred. 4 g of nitric acid (65%, m/m) was dissolved in 80 ml of deionized water to formulate a nitric acid solution. The nitric acid solution was added into the kneader. The mixture was kneaded to become lumpy, molded by extrusion on a bar-extruder with φ3 mm clover-type or four-leaf clover-type pore plate, dried at 110° C. for 4 h, calcined at 550° C. for 4 h to produce $TiO_2$—$Al_2O_3$ compound support series. The properties thereof are shown in Table 2.

TABLE 2

Physicochemical properties of the support

| Support | $TiO_2$, % | Pore volume/ $ml \cdot g^{-1}$ | Specific surface area/$m^2 \cdot g^{-1}$ |
|---|---|---|---|
| 1 | 50 | 0.26 | 209 |
| 2 | 40 | 0.33 | 238 |
| 3 | 30 | 0.45 | 270 |
| 4 | 20 | 0.55 | 318 |
| 5 | 10 | 0.62 | 353 |
| 6 | 0 | 0.71 | 368 |

Example 3

Preparation of the Semi-Finished Product of the Catalyst 70 g of deionized water and 3 g of citric acid were added into a reaction bottle, stirred and mixed. Then 50 g of ferrous sulfate was added therein, dissolved by stirring until the solution was transparent, to formulate a stable impregnation solution. 10 g of No. 1-6 supports in Table 1 were respectively impregnated for 1 h while maintaining the same ferrous sulfate content, oven-dried at 110° C. for 4 h, calcined at 400° C. for 4 h to produce the semi-finished products 1-1, 2-1, 3-1, 4-1, 5-1 and 6-1. The properties thereof are shown in Table 3.

TABLE 3

Physicochemical properties of the semi-finished products of the catalyst

| Properties | 1-1 | 2-1 | 3-1 | 4-1 | 5-1 | 6-1 |
|---|---|---|---|---|---|---|
| Specific surface area/m² · g⁻¹ | 192 | 213 | 248 | 301 | 335 | 346 |
| Pore volume/ ml · g⁻¹ | 0.25 | 0.31 | 0.42 | 0.50 | 0.56 | 0.64 |
| Crushing strength/ N · cm⁻¹ | 192 | 198 | 195 | 188 | 186 | 188 |
| FeSO₄ weight percent, % | 5 | 5 | 5 | 5 | 5 | 5 |

Example 4

Preparation of the Catalyst Series 1-2, 2-2, 3-2, 4-2, 5-2 and 6-2

100 g of deionized water and 18 g of phosphoric acid were added into a reaction tank and heated. Then 54 g of ammonium molybdate and 11 g of basic cobalt carbonate were dissolved therein, dissolved by stirring until the solution was transparent. 9 g of nickel carbonate was added, dissolved by stirring until the solution was transparent, to formulate a purple, transparent cobalt, molybdenum and nickel impregnation solution. According to the water absorption of the semi-finished catalyst products in Table 2, 10 g of the semi-finished products 1-1, 2-1, 3-1, 4-1, 5-1 and 6-1 were respectively impregnated for 1 h, oven-dried at 110° C. for 4 h, calcined at 400° C. for 4 h to produce the catalyst series 1-2, 2-2, 3-2, 4-2, 5-2 and 6-2. The properties thereof are shown in Table 4.

TABLE 4

Physicochemical properties of the catalyst

| Properties | 1-2 | 2-2 | 3-2 | 4-2 | 5-2 | 6-2 |
|---|---|---|---|---|---|---|
| Specific surface area/m² · g⁻¹ | 160 | 178 | 222 | 259 | 281 | 312 |
| Pore volume/ m² · g⁻¹ | 0.28 | 0.31 | 0.41 | 0.47 | 0.51 | 0.54 |
| Crushing strength/ N · cm⁻¹ | 190 | 192 | 190 | 183 | 185 | 182 |
| Bulk density/ kg · L⁻¹ | 0.85 | 0.80 | 0.75 | 0.70 | 0.64 | 0.62 |
| TiO₂ weight percent, % | 37.5 | 30.0 | 22.5 | 15.0 | 7.5 | 0 |
| FeSO₄ weight percent, % | 4 | 4 | 4 | 4 | 4 | 4 |
| MoO₃ weight percent, % | 15 | 15 | 15 | 15 | 15 | 15 |
| (CoO + NiO) weight percent, % | 3.5 | 3.5 | 3.5 | 3.5 | 3.5 | 3.5 |

Example 5

Evaluation of the Catalyst Activity

Evaluation of the catalyst activity was conducted in a 10 ml micro-reactor. The reactor was made of stainless steel tube having an inner diameter of 20 mm, placed in a thermostat which was electrically heated, similar to an equi-heat furnace. The catalyst has a loading amount of 10 mL with a particle size of 20-40 meshes. Quartz sand having the same particle size was loaded onto the upper of the catalyst, mixed and pre-heated. SHIMUZU GC-2014 gas chromatograph was used to on-line analyze the content of $H_2S$, $SO_2$ and $CS_2$ in the gas at the inlet and outlet of the reactor; the chromatographic column loaded with GDX-301 carrier was used to analyze the sulfide, wherein the column temperature was 120° C.; a thermal conductivity detector was used; hydrogen was used as the carrier gas; the post-column flow rate was 28 mL/min.

Figure 2:
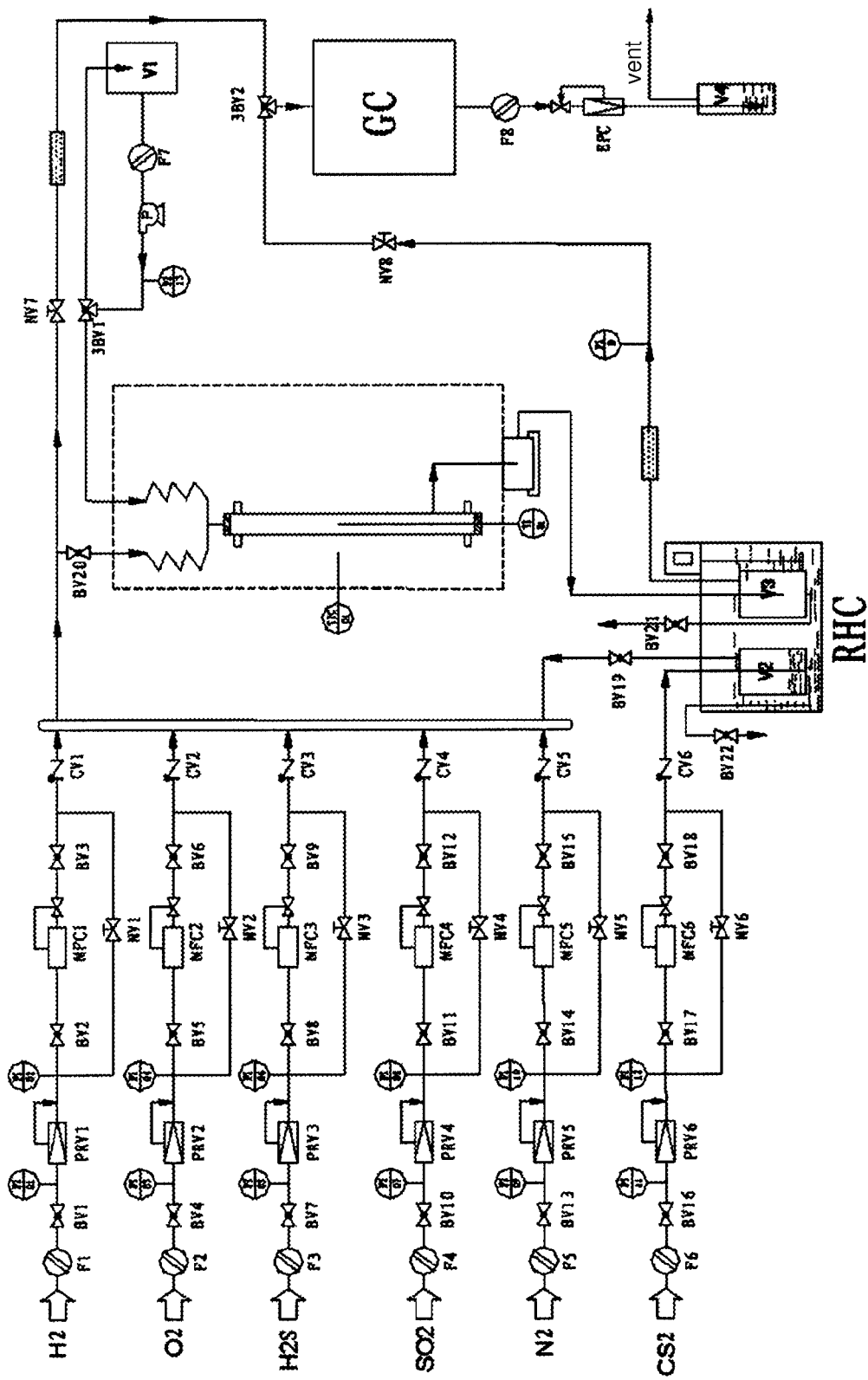
FIG. 2 is schematic diagram of the laboratory 10 ml sulfur micro-reactor evaluation device of the present invention.

The technological process of the laboratory micro-reactor evaluation device is shown in FIG. 2.

The gas composition of Claus tail gas and flue gas regenerated by absorptive desulfurization of gasoline was simulated, controlled by controlling the flow rate of $N_2$, air, $CO_2$, $H_2S$, $SO_2$, $CS_2$, $O_2$, $H_2$ and water vapor, pre-heated to a certain temperature (200-260° C.) and then fed into a fixed bed reactor loaded with catalysts and fillers. After the gas was hydrogenated, and the sulfur-containing compound was absorbed by an alkaline solution (10% sodium hydroxide), the clean tail gas was discharged into air. Tests of analyzing the composition of a group of feed gas and tail gas per hour were conducted, and the results are used as the basis for calculating the activities of the catalysts.

After the testing equipment passed the airtightness testing, the catalyst was precured by the conventional dry process at a normal pressure, a volume space velocity of 1250 h⁻¹, wherein the sulfurization gas was hydrogen plus 2(v) % of hydrogen sulfide.

Sulfurization steps: heating with nitrogen gas to 200° C. in a rate of 50° C./h by adjusting the nitrogen gas flow according to the space velocity, switching to sulfurization gas and adjusting the gas flow, continuing to heat to 240° C., maintaining the temperature for 3 h, finishing the sulfurization after hydrogen sulfide at the outlet and inlet of the reactor reached an equilibrium, then switching to the reaction gas comprising 1.2 vol. % of $SO_2$, 10 vol. % of $H_2$, 0.4 vol. % of $O_2$, 0.5 vol. % of $CS_2$, 30 vol. % of $H_2O$, and the balance being nitrogen gas. The $SO_2$ hydrogenation activity of the catalysts was evaluated by using $3H_2+SO_2 \rightarrow H_2S+2H_2O$ as the indicator reaction; the organic sulfur hydrolysis activity of the catalysts was evaluated by using $CS_2+H_2O \rightarrow CO_2+H_2S$ as the indicator reaction; the $O_2$ removal activity of the catalysts was evaluated by using $2H_2+O_2 \rightarrow 2H_2O$ as the indicator reaction. The gas volume space velocity was 1250 h⁻¹, and the reaction temperature was 240° C. The hydrogenation conversion activity of the catalysts was calculated according to the following formula:

$$\eta_{SO2 \text{ or } CS2 \text{ or } O2} = \frac{M_0 - M_1}{M_0} \times 100\%$$

wherein $M_0$ and $M_1$ respectively represent the volume concentrations of $SO_2$, $O_2$ or $CS_2$ at the inlets and outlets of the reactor.

The $SO_2$ hydrogenation and $CS_2$ hydrolysis activities of the catalysts in Table 4 are shown in Table 5.

TABLE 5

Activities of the hydrogenation catalysts

| Items | 1-2 | 2-2 | 3-2 | 4-2 | 5-2 | 6-2 |
|---|---|---|---|---|---|---|
| SO₂ hydrogenation conversion rate, % | 93.2 | 96.8 | 100 | 100 | 96.5 | 93.9 |

TABLE 5-continued

Activities of the hydrogenation catalysts

| Items | 1-2 | 2-2 | 3-2 | 4-2 | 5-2 | 6-2 |
|---|---|---|---|---|---|---|
| $CS_2$ hydrolysis rate, % | 90.6 | 98.2 | 100 | 100 | 93.5 | 88.1 |
| $O_2$ hydrogenation conversion rate, % | 100 | 100 | 100 | 100 | 100 | 100 |

Example 6

Preparation of the Catalyst Series Having Different Metal Contents

No. 3 support prepared according to Example 2 was used to produce a semi-finished product according to Example 3, and then to further produce the catalysts 3-2, 3-3, 3-4, 3-5 and 3-6 having different metal contents according to Example 4. The physicochemical properties thereof are shown in Table 6.

TABLE 6

Physicochemical properties of the catalysts

| Properties | 3-2 | 3-3 | 3-4 | 3-5 | 3-6 |
|---|---|---|---|---|---|
| Specific surface area/$m^2 \cdot g^{-1}$ | 245 | 238 | 230 | 222 | 209 |
| Pore volume/$m^2 \cdot g^{-1}$ | 0.43 | 0.42 | 0.42 | 0.41 | 0.40 |
| Crushing strength/$N \cdot cm^{-1}$ | 190 | 185 | 188 | 190 | 189 |
| Bulk density/$kg \cdot L^{-1}$ | 0.73 | 0.74 | 0.74 | 0.75 | 0.76 |
| $FeSO_4$ weight percent, % | 5.0 | 2.0 | 4.0 | 4.0 | 1.0 |
| $MoO_3$ weight percent, % | 10.0 | 12.0 | 12.0 | 15.0 | 20.0 |
| (CoO + NiO) weight percent, % | 2.5 | 3.0 | 3.0 | 3.5 | 5.0 |

According to the method for activity evaluation of the catalysts in Example 5, the activity evaluation was conducted for 5 catalysts in Table 6, and the $SO_2$ hydrogenation and $CS_2$ hydrolysis activities are shown in Table 7.

TABLE 7

Activities of the hydrogenation catalysts

| Items | 3-2 | 3-3 | 3-4 | 3-5 | 3-6 |
|---|---|---|---|---|---|
| $SO_2$ hydrogenation conversion, % | 100 | 100 | 100 | 100 | 100 |
| $CS_2$ hydrolysis rate, % | 100 | 100 | 100 | 100 | 100 |
| $O_2$ hydrogenation conversion rate, % | 100 | 100 | 100 | 100 | 100 |

Example 7

Comparison Example

According to the method for preparation of the catalyst in Example 4, No. 3 support prepared according to Example 2 was made without the procedure of the preparation of the semi-finished product in Example 3 into a hydrogenation catalysts 3-7 containing no deoxidation auxiliary agent. The comparison of the physicochemical properties of the catalyst and the catalyst of the present invention are shown in Table 8.

TABLE 8

Comparison of the physicochemical properties of the catalysts

| Properties | Catalyst 3-7 | Catalyst of the present invention |
|---|---|---|
| Active component content: | | |
| $MoO_3$, weight % | 15.0 | 15.0 |
| (CoO + NiO) weight % | 3.5 | 3.5 |
| $FeSO_4$ weight % | 0 | 4.0 |
| Side pressure strength/$N \cdot cm^{-1}$ | 295 | 305 |
| Specific surface area/$m^2 \cdot g^{-1}$ | 195 | 189 |
| Pore volume/$ml \cdot g^{-1}$ | 0.32 | 0.32 |
| Bulk density/$kg \cdot L^{-1}$ | 0.79 | 0.80 |

According to the method for activity evaluation of the catalyst in Example 5, the comparison between the hydrogenation activities of the catalyst 3-7 and the catalyst of the present invention is shown in Table 9.

TABLE 9

Comparison of the activities of the catalysts

| Temperature/° C. | Items | Catalysts 3-7 | Catalyst of the present invention |
|---|---|---|---|
| 220 | $SO_2$ hydrogenation conversion, % | 90 | 96 |
|  | $CS_2$ hydrolysis rate, % | 82 | 91 |
|  | $O_2$ removal rate, % | 30 | 90 |
| 240 | $SO_2$ hydrogenation conversion, % | 98 | 100 |
|  | $CS_2$ hydrolysis rate, % | 95 | 100 |
|  | $O_2$ removal rate, % | 50 | 98 |

Table 9 shows that the addition of deoxidation auxiliary agent greatly increases the deoxidation activity of the catalyst of the present invention, and increases the low temperature $SO_2$ hydrogenation and organic sulfur hydrolysis activities of the catalyst, which shows that the deoxidation auxiliary agent and the active components have better synergistic effect therebetween.

Example 8

Physicochemical Property Comparison between the Conventional Claus Tail Gas Hydrogenation Catalyst and the Catalyst of the Present Invention Physicochemical property comparison between the conventional Claus tail gas hydrogenation catalyst and the catalyst of the present invention is shown in Table 10.

TABLE 10

Comparison of the physicochemical properties of the catalysts

| Properties | Conventional Claus tail gas hydrogenation catalyst | Catalyst of the present invention |
|---|---|---|
| Active component content: | | |
| $MoO_3$ weight % | 10.0 | 15.0 |
| (CoO + NiO) weight % | 2.5 | 3.5 |
| $FeSO_4$ weight % | 0 | 4.0 |
| Side pressure strength/$N \cdot cm^{-1}$ | 165 | 305 |
| Specific surface area/$m^2 \cdot g^{-1}$ | 320 | 189 |
| Pore volume/$ml \cdot g^{-1}$ | 0.50 | 0.32 |
| Bulk density/$kg \cdot L^{-1}$ | 0.60 | 0.80 |

TABLE 10-continued

Comparison of the physicochemical properties of the catalysts

| Properties | Conventional Claus tail gas hydrogenation catalyst | Catalyst of the present invention |
|---|---|---|
| Support | Alumina | Titanium-aluminum compound support |

According to the method for activity evaluation of the catalyst in Example 5, the comparison between the activities of the conventional Claus tail gas hydrogenation catalyst and the catalyst of the present invention is shown in Table 11.

TABLE 11

Comparison of the catalyst activities

| Temperature/° C. | Items | Conventional Claus tail gas hydrogenation catalyst | Catalyst of the present invention |
|---|---|---|---|
| 240 | $SO_2$ hydrogenation conversion, % | 76 | 100 |
| | $CS_2$ hydrolysis rate, % | 68 | 100 |
| | $O_2$ removal rate, % | 45 | 98 |
| 260 | $SO_2$ hydrogenation conversion, % | 95 | 100 |
| | $CS_2$ hydrolysis rate, % | 98 | 100 |
| | $O_2$ removal rate, % | 92 | 100 |
| 280 | $SO_2$ hydrogenation conversion, % | 100 | 100 |
| | $CS_2$ hydrolysis rate, % | 100 | 100 |
| | $O_2$ removal rate, % | 100 | 100 |

Table 11 shows that the catalyst of the present invention has better low-temperature $SO_2$ hydrogenation activity, organic sulfur hydrolysis activity and deoxidation activity, while the conventional Claus tail gas hydrogenation catalyst cannot satisfy the requirements on the $SO_2$ hydrogenation, organic sulfur hydrolysis and deoxidation unless there is a higher reaction temperature. Moreover, when the sulfur-containing gas has a higher $SO_2$ content, the conventional Claus tail gas hydrogenation catalyst is easy to sulfatize, so that $SO_2$ penetrate the catalyst bed layer.

Example 9

Industrial Application Tests of the Catalyst

The catalyst 3-2 of the present invention was prepared and loaded into the tail gas hydrogenation reactor of the industrial sulfur device. The process chart for treating the regenerated flue gas is shown in FIG. 1.

The catalyst 3-2 was precured by the conventional Claus tail gas at a temperature of 220-280° C., a volume space velocity of 400-1,500 $h^{-1}$, wherein hydrogen was in an amount of 3-8 vol. % of the feed gas. When $H_2S$ content at the outlet of the reactor was greater than or equal to that at the inlet thereof, sulfurization stopped. After sulfurization, the temperature at the inlet of the hydrogenation reactor was adjusted to 220-280° C. While introducing the Claus tail gas, flue gas regenerated by absorptive desulfurization of gasoline was also introduced. The composition, flow rate and temperature of the flue gas regenerated by absorptive desulfurization of gasoline are shown in Table 12.

TABLE 12

Composition, flow rate and temperature of the regenerated flue gas

| No. | Flow rate/ $Nm^3 \cdot h^{-1}$ | $SO_2$ vol. % | $O_2$ vol. % | Temperature when entering the reactor/° C. |
|---|---|---|---|---|
| 1 | 329 | 2.91 | 0.00 | 131 |
| 2 | 423 | 0.16 | 2.60 | 133 |
| 3 | 554 | 3.32 | 0.05 | 129 |
| 4 | 764 | 1.76 | 0.86 | 125 |
| 5 | 611 | 1.58 | 0.98 | 132 |
| 6 | 636 | 0.51 | 1.25 | 132 |
| 7 | 506 | 2.40 | 0.30 | 128 |
| 8 | 371 | 0.17 | 1.20 | 129 |
| 9 | 256 | 1.96 | 0.03 | 126 |
| 10 | 261 | 0.09 | 3.42 | 133 |
| 11 | 95 | 3.16 | 0.00 | 133 |

According to the data in Table 12, it can be seen that the flow rate of the flue gas regenerated by absorptive desulfurization of gasoline has a great fluctuation; the $SO_2$ content in the flue gas regenerated by absorptive desulfurization of gasoline has a great fluctuation with the maximum of 3.32% and the minimum of 0.09%; the oxygen content in the flue gas regenerated by absorptive desulfurization of gasoline has a great fluctuation with the maximum of 3.42% and the minimum of 0.00%; the flue gas regenerated by absorptive desulfurization of gasoline entering the reactor has a lower temperature, wherein the temperature is just 126-133° C. in summer and will be much lower in winter.

Example 10

Effect on the Temperature Rise of the Catalyst Bed Layer before and after Introducing the Flue Gas Regenerated by Absorptive Desulfurization of Gasoline The normal temperature rise of the bed layer for the Claus tail gas hydrogenation was 30-40° C. After the introduction of the flue gas regenerated by absorptive desulfurization of gasoline, the flow rate of the Claus tail gas was 2,000-3,000 $Nm^3/h$; the flow rate of the flue gas regenerated by absorptive desulfurization of gasoline was about 300-1,000 $Nm^3/h$, wherein the flow rate of the flue gas regenerated by absorptive desulfurization of gasoline was 30% of the normal flow rate of the Claus tail gas. The effects on the catalyst bed layer before and after the introduction of the regenerated flue gas are shown in Table 13.

TABLE 13

Change of the temperature rise of the catalyst bed layer before and after introducing the flue gas regenerated by absorptive desulfurization of gasoline

| Materials | Inlet/ ° C. | upper/ ° C. | middle/ ° C. | bottom/ ° C. | temperature rise of the bed layer/° C. |
|---|---|---|---|---|---|
| Claus tail gas | 234 | 244 | 256 | 266 | 32 |
| | 243 | 266 | 277 | 280 | 37 |
| | 247 | 272 | 282 | 285 | 38 |
| Claus tail gas + Flue gas by absorptive desulfurization of gasoline | 256 | 283 | 291 | 291 | 35 |
| | 248 | 295 | 310 | 314 | 66 |
| | 247 | 296 | 311 | 312 | 65 |
| | 246 | 304 | 323 | 325 | 79 |
| | 244 | 305 | 321 | 321 | 77 |
| | 247 | 300 | 317 | 320 | 73 |
| | 247 | 297 | 312 | 315 | 68 |
| | 247 | 297 | 317 | 319 | 72 |

TABLE 13-continued

Change of the temperature rise of the catalyst bed layer before and after introducing the flue gas regenerated by absorptive desulfurization of gasoline

| Materials | Inlet/ °C. | upper/ °C. | middle/ °C. | bottom/ °C. | temperature rise of the bed layer/° C. |
|---|---|---|---|---|---|
| | 244 | 283 | 295 | 297 | 53 |
| | 243 | 294 | 308 | 314 | 71 |
| | 244 | 283 | 297 | 299 | 55 |
| | 246 | 296 | 309 | 311 | 65 |

According to the results in Table 13, it can be seen that the normal bed layer temperature rise of the Claus tail gas hydrogenation is 30-40° C., and is increased to 50-80° C. after the introduction of the flue gas regenerated by absorptive desulfurization of gasoline. Since the catalyst of the present invention has a better low-temperature hydrogenation activity, the inlet temperature of the hydrogenation reactor was controlled to be 240-250° C., and the maximum temperature of the bed layer may be 325° C., while the normal application temperature of the catalyst of the present invention is 220-360° C. Due to unstable flow rate and composition of the flue gas regenerated by absorptive desulfurization of gasoline, the temperature rise of the bed layer may be varied, but without overtemperature or huge fluctuation of the bed layer, which shows that the catalyst of the present invention can satisfy the requirements on the flow rate and composition fluctuation of the flue gas regenerated by absorptive desulfurization of gasoline.

Example 11

Composition of the Gas at the Outlet of the Hydrogenation Reactor after Introducing the Flue Gas Regenerated by Absorptive Desulfurization of Gasoline The composition of the gas at the outlet of the hydrogenation reactor after introducing the flue gas regenerated by absorptive desulfurization of gasoline is shown in Table 14.

TABLE 14

Composition of the gas at the outlet of the hydrogenation reactor

| No. | $H_2S$ vol. % | $SO_2$ vol. % | $O_2$ vol. % |
|---|---|---|---|
| 1 | 2.41 | 0 | 0 |
| 2 | 2.16 | 0 | 0 |
| 3 | 1.86 | 0 | 0 |
| 4 | 1.52 | 0 | 0 |
| 5 | 2.15 | 0 | 0 |
| 6 | 1.54 | 0 | 0 |
| 7 | 2.41 | 0 | 0 |
| 8 | 2.92 | 0 | 0 |
| 9 | 2.30 | 0 | 0 |
| 10 | 0.62 | 0 | 0 |
| 11 | 2.23 | 0 | 0 |

According to the data in Table 14, it can be seen that the presence of $SO_2$ or $O_2$ is not detected in the hydrogenated tail gas, which shows that the catalyst of the present invention has a better hydrogenation effect. Under the circumstance that $SO_2$ is in a higher content in the process gas, and in the presence of oxygen, the catalyst of the present invention can satisfy the requirements on the flow rate and composition fluctuation of the flue gas regenerated by absorptive desulfurization of gasoline.

The invention claimed is:

1. A hydrogenation catalyst, characterized in that the catalyst comprises from 0.5 to 3 wt. % of an active component nickel oxide; from 1 to 4 wt. % of an active component cobalt oxide; from 8 to 20 wt. % of an active component molybdenum oxide or tungsten oxide; from 1 to 5 wt. % of a deoxidation auxiliary agent selected from one or more of ferrous sulfate, ferric nitrate and ferric sulfate; from 10 to 40 wt. % of $TiO_2$, the balance being $\gamma$-$Al_2O_3$, based on the weight of the catalyst, wherein $TiO_2$ and $\gamma$-$Al_2O_3$ are added in the form of titanium-aluminum compound dry colloid.

2. The hydrogenation catalyst according to claim 1, characterized in that the deoxidation auxiliary agent is ferrous sulfate.

3. The hydrogenation catalyst according to claim 1, characterized in that the catalyst comprises from 1.0 to 1.5 wt. % of an active component nickel oxide, from 2.0 to 3.0 wt. % of an active component cobalt oxide, from 12 to 15 wt. % of an active component molybdenum oxide or tungsten oxide, from 2 to 4 wt. % of a deoxidation auxiliary agent, from 20 to 30 wt. % of $TiO_2$, the balance being $\gamma$-$Al_2O_3$, based on the weight of the catalyst.

4. The hydrogenation catalyst according to claim 1, which is produced by the following steps: using titanium-aluminum compound dry colloid as the main material, bar-extruding, drying, calcining to prepare a support; said support being impregnated with a deoxidation auxiliary agent, dried, calcined to produce a semi-finished product; said semi-finished product being impregnated with an impregnation solution of the active components nickel, cobalt and molybdenum compounds, further dried and calcined.

5. The hydrogenation catalyst according to claim 4, characterized in that said titanium-aluminum compound dry colloid is produced by feeding $CO_2$ having a volume concentration of 3-40% into a sodium metalluminate solution of 5-60 g of $Al_2O_3$/L for neutralization, adding metatitanic acid slurry simultaneously, so as to make the weight content of titania achieve 30-60% in the dry colloid, controlling the pH value of the glue solution to be 10-12, stopping the colloidization, filtering, washing, drying and pulverizing to produce a titanium-aluminum compound dry colloid.

6. The hydrogenation catalyst according to claim 5, characterized in that the titanium-aluminum compound dry colloid has a pore volume of greater than 0.6 ml/g, a specific surface area of greater than 250 $m^2$/g, a sodium weight content of less than 0.1%, and a $SO_4^{2-}$ weight content of less than 0.2%.

7. The hydrogenation catalyst according to claim 6, characterized in that the titanium-aluminum compound dry colloid has a pore volume of from 0.60 to 0.90 mL/g and a specific surface area of from 270 to 380 $m^2$/g.

8. A method for processing a sulfur-containing gas with the hydrogenation catalyst according to claim 1, characterized in introducing the sulfur-containing gas into the tail gas hydrogenation unit of a sulfur recovery device, processing it with said hydrogenation catalyst, absorbing the hydrogenated tail gas with a solvent and then regenerating, the regenerated hydrogen sulfide being recycled to the Claus unit to recover sulfur, the clean tail gas being incinerated in an incinerator to be discharged after reaching the standards.

9. The method for processing a sulfur-containing gas according to claim 8, characterized in that the sulfur-containing gas is one or more selected from flue gas regenerated by adsorptive desulfurization of gasoline, flue gas regenerated by desulfurization of liquefied gas and Claus tail gas.

10. The method for processing a sulfur-containing gas according to claim 8, characterized in that (1) the hydrogenation catalyst is precured with Claus tail gas under the conditions of a temperature of from 220 to 280° C., a volume space velocity of from 400 to 1,500 $h^{-1}$, from 3 to 8 vol. % of hydrogen in the feed gas, the curing is finished when the $H_2S$ content at the outlet of the reactor is greater than or equal to that at the inlet of the reactor; and (2) after curing, adjusting the inlet temperature of the hydrogenation reactor to be from 220 to 280° C., at which the sulfur-containing gas is introduced.

11. The method for processing a sulfur-containing gas according to claim 8, characterized in that the sulfur-containing gas comprises from 0 to 6 vol. % of sulfur dioxide and from 0 to 3 vol. % of oxygen.

12. The method for processing a sulfur-containing gas according to claim 8, characterized in that the sulfur-containing gas enters the sulfur device at a temperature of from 100 to 200° C.

\* \* \* \* \*